United States Patent
Ursel et al.

(10) Patent No.: US 6,553,867 B1
(45) Date of Patent: Apr. 29, 2003

(54) DRIVE DEVICE FOR DISPLACING ELEMENTS PERTAINING TO A VEHICLE

(75) Inventors: Eckhard Ursel, Buehl (DE); Erik Maennle, Oberkirch (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/869,415

(22) PCT Filed: Sep. 7, 2000

(86) PCT No.: PCT/DE00/03093

§ 371 (c)(1),
(2), (4) Date: Aug. 10, 2001

(87) PCT Pub. No.: WO01/30603

PCT Pub. Date: May 3, 2001

(30) Foreign Application Priority Data

Oct. 28, 1999 (DE) .......................... 199 51 978

(51) Int. Cl.[7] .............................................. F16H 37/06
(52) U.S. Cl. ................ 74/665 G; 74/665 GE
(58) Field of Search ................ 74/10.45, 664, 74/665 R, 665 A, 665 G, 665 GA, 665 GE, 10.1, 10.29, 10.6

(56) References Cited

U.S. PATENT DOCUMENTS

| | | | | |
|---|---|---|---|---|
| 2,931,424 A | * | 4/1960 | Pickles | ............... 74/665 G X |
| 4,299,316 A | * | 11/1981 | Reinmoeller | ....... 74/665 GA X |
| 4,527,767 A | * | 7/1985 | Rees | ........................... 248/419 |
| 4,728,873 A | * | 3/1988 | Inoue et al. | ................. 318/568 |
| 4,923,250 A | * | 5/1990 | Hattori | ....................... 297/410 |
| 4,944,554 A | * | 7/1990 | Gross et al. | ................. 297/284 |
| 5,035,262 A | * | 7/1991 | Schweikert | ................. 137/607 |
| 5,092,197 A | | 3/1992 | Hauger | |
| 5,103,691 A | | 4/1992 | Periou | |
| 5,269,031 A | * | 12/1993 | Alexander | .......... 74/665 GE X |
| 5,467,957 A | | 11/1995 | Gauger | |
| 5,481,441 A | * | 1/1996 | Stevens | ................ 74/665 G X |

FOREIGN PATENT DOCUMENTS

FR   4 768 973 A   4/1999

* cited by examiner

Primary Examiner—Saul Rodriguez
Assistant Examiner—Roger Pang
(74) Attorney, Agent, or Firm—Michael J. Striker

(57) ABSTRACT

Driver device for adjusting interior trim parts belonging to a motor vehicle, in particular parts of a motor vehicle seat, having an electric drive motor (10) that includes a first driven part (14) and a driven unit (16) driven by it having at least two couplings (18).

It is proposed that the driven unit (16) include a coupling actuator (20) for the selective actuation of at least two couplings (18).

10 Claims, 3 Drawing Sheets

DRIVE DEVICE FOR DISPLACING ELEMENTS PERTAINING TO A VEHICLE

BACKGROUND INFORMATION

The invention relates to a driver device for adjusting interior trim parts belonging to a motor vehicle, in particular, parts of a motor vehicle seat, according to the general class of the primary claim.

Driver devices are already known with which various interior trim parts of a motor vehicle can be adjusted using only one motor. Depending on the number of interior trim parts to be adjusted, a corresponding number of couplings will be used for this purpose that make an independent motion of these interior trim parts possible.

A disadvantage of this is that each individual coupling must be actuated using a separate coupling actuator. This is a high material expenditure that not only generates costs, but also entails a high complexity of such driver devices.

ADVANTAGES OF THE INVENTION

The driver device according to the invention for adjusting interior trim parts belonging to a motor vehicle having the features of the primary claims not only has the advantage that various driven parts can be driven by one single electric drive motor, it also has the further decisive advantage that the various couplings required for this can be controlled by way of only one coupling actuator.

This eliminates the need to use one coupling actuator for each coupling, which provides obvious weight and cost advantages. Moreover, the driver device can be designed to be very compact and relatively simple, which represents a further advantage.

As a result of the measures indicated in the subclaims, advantageous further developments of the device according to the primary claim are possible.

It is an advantage, for instance, if the driven unit includes a coupling control shaft that cooperates with the coupling actuator and the at least two couplings for the selective actuation of at least two couplings. In a technically very simple form, this makes the selective actuation and/or control of the individual couplings possible by way of the central coupling actuator.

A further advantage is when the coupling control shaft includes cams that are offset by 120° from each other when three couplings are present. The individual couplings can be actuated by adjusting these cams; together with the coupling control shaft they represent a type of extended arm of the coupling actuator.

Each of the at least two couplings includes a first coupling element and a second coupling element. When engaged, these two coupling elements enter into a frictionally engaged connection and ensure that a rotary motion caused by the drive motor is transmitted to the corresponding driven parts. In order to ensure this transmission of the rotary motion, second driven parts are integrated in the first coupling elements in an advantageous manner, which second driven parts are connected with the first driven part of the drive motor.

A toothed belt is suited for use to make the connection, but any type of connecting chain or direct connecting forms such as forms having gears are also feasible.

The engagement of the second coupling elements in the rotating, first coupling elements of the at least two couplings with the aid of the coupling control shaft makes a frictionally engaged connection possible that is transmitted to each of the third driven parts of the second coupling element.

Each of these third driven parts can include square sockets, for instance, which are excellently suited to accommodate flexible shafts, for instance, in order to transmit the adjacent torques to the respective interior trim parts.

A further decisive advantage is produced when the at least two couplings basically lie on a line. Not only because the various couplings can then be controlled using a single control shaft, but also because this arrangement of the driven parts allows the driver device to be integrated in the existing seat structures and makes corresponding new developments superfluous.

It is also advantageous when each of the second driven parts has a different diameter. This allows the reduction of the drive to vary, and it also provides a possibility for adjusting and adapting the various interior trim parts to be adjusted. For example, the fore/aft and height adjustment of a motor vehicle seat will require greater effort than adjusting the tilt of a seatback, for instance.

In general, the reduction can also be selected in such a way that the flexible shafts, for instance, with which torques are transmitted to the individual interior trim parts, can rotate relatively slowly, thereby minimizing noise problems in advance.

The third driven parts of each of the second coupling elements can also include gears or similar parts, of course, that are suited to transmitting a torque.

DRAWING

The drawing shows a design example of a driver device according to the invention. It is explained in greater detail in the subsequent desciption.

DESCRIPTION OF THE DESIGN EXAMPLES

Figure 1:
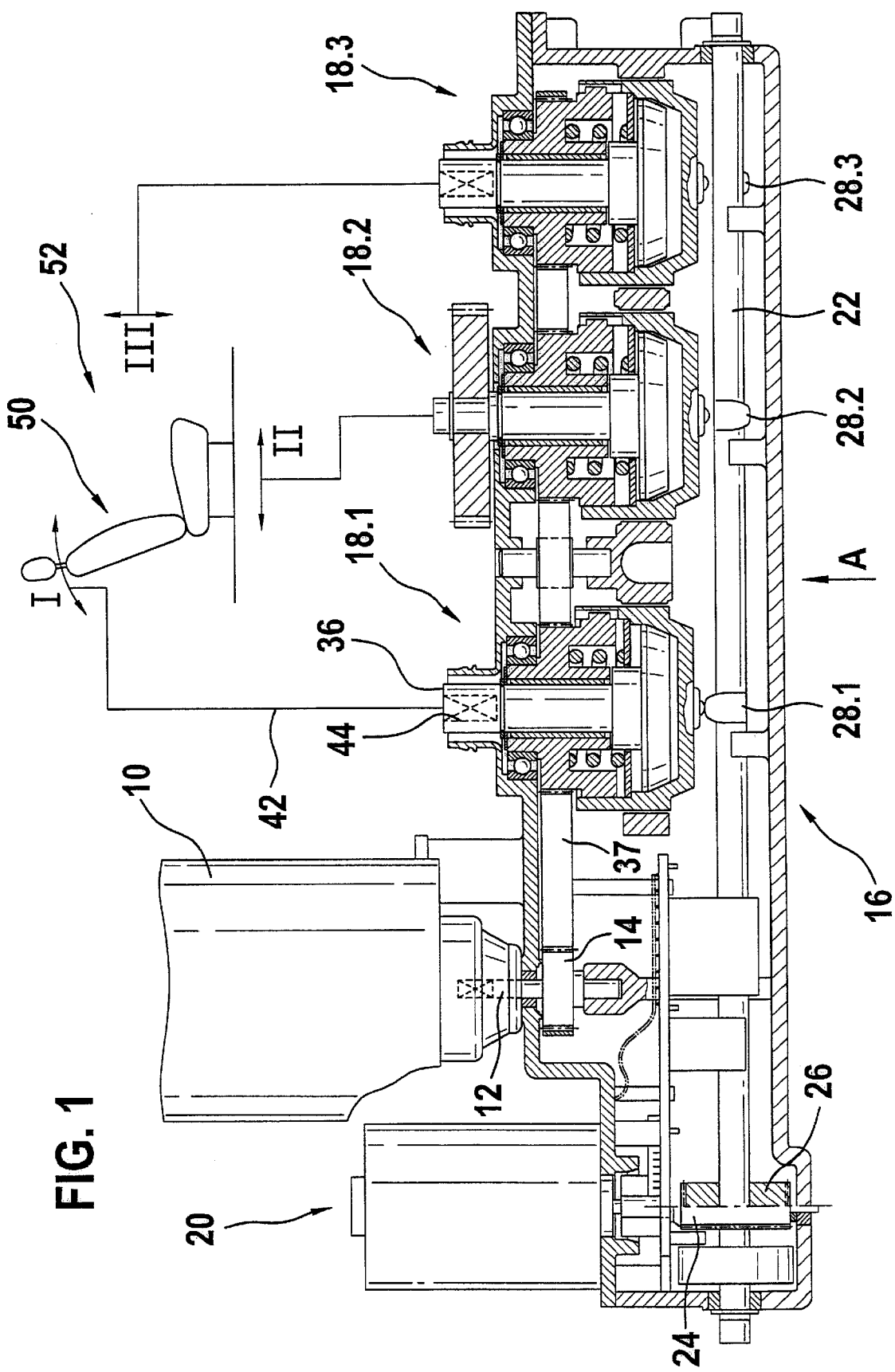
FIG. 1 shows a sectional drawing of the design example with a connection to a motor vehicle seat.

The driver device shown in FIG. 1 for adjusting interior trim parts belonging to a motor vehicle includes an electric drive motor 10 having a first driven part 14 situated on a shaft 12.

The drive motor 10 drives a driven unit 16 having three couplings 18.1, 18.2 and 18.3, a coupling actuator 20, and a coupling control shaft 22. The coupling actuator 20 in this design example is an electric motor that is connected to the control shaft 22 by way of a worm gear comprising an endless screw 24 and a worm wheel 26. In operation, the rotary motion of the coupling actuator 20 is transmitted to the control shaft 22 by way of the worm gear, whereby the cams 28.1 through 28.3—each of which is arranged on the control shaft 22 in such a way that they are offset by 120° in relation to each other—are put into rotary motion. One of the three couplings 18.1 through 18.3 is actuated, depending on the position of the control shaft 22.

Figure 2:
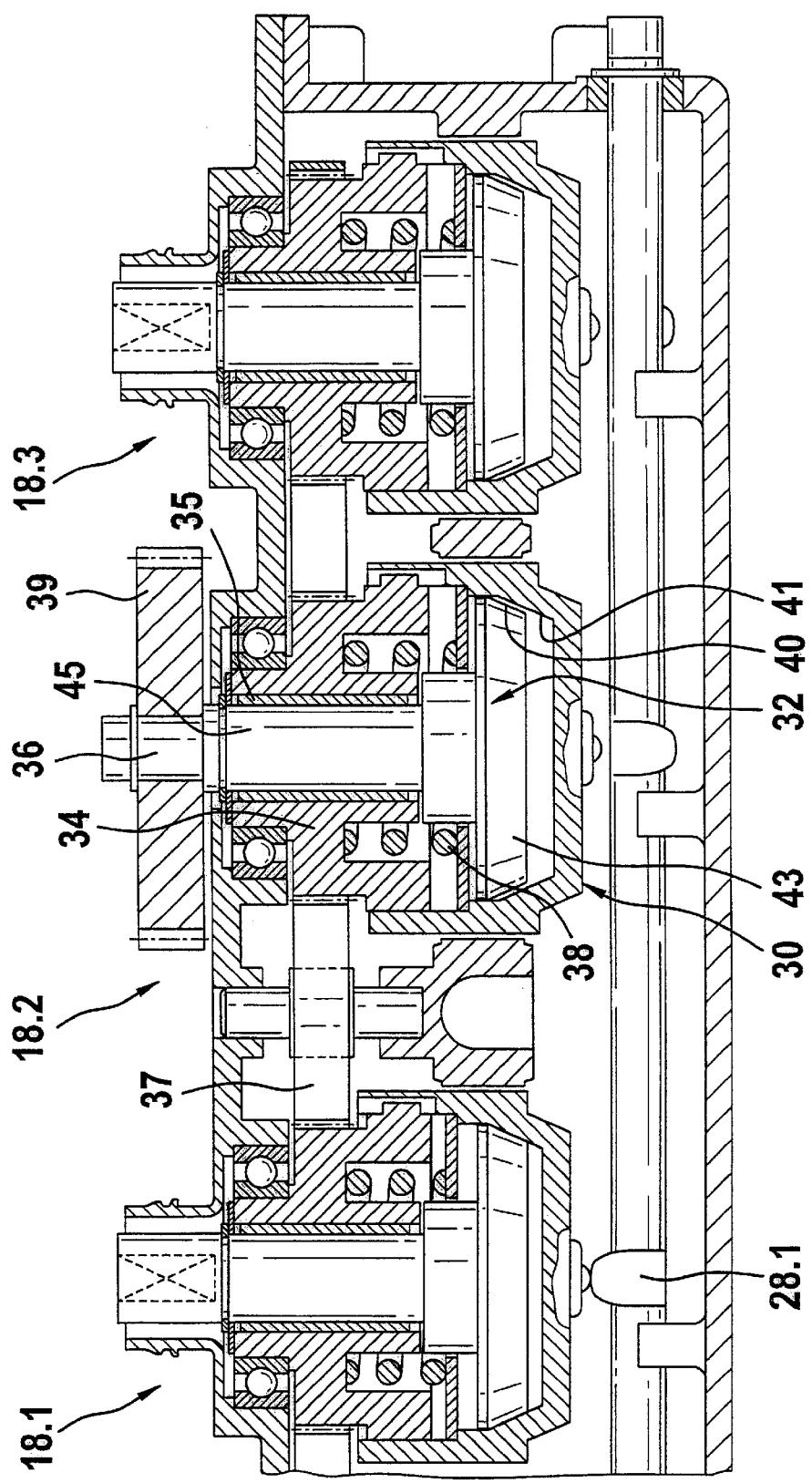
FIG. 2 shows an enlarged view of the area of the couplings.

The details of the couplings 18.1 through 18.3 are shown in FIG. 2, whereby, for the sake of simplicity and greater clarity, the description is limited to the middle of the three couplings 18.2, and the same features are labelled with the same reference numbers. Since the couplings are basically identical, this should be sufficient to provide an understanding of the invention.

Each of the couplings 18.1 through 18.3 includes a first coupling element 30 and a second coupling element 32. Integrated in each of the first coupling elements 30 are second driven parts 34 that are connected with each other and with the first driven part 14 of the electric drive motor 10 by way of a toothed belt 36 (FIG. 1). They are supported in spherical cap bearings 35 in a rotatable manner so that, during operation of the electric drive motor 10, the first coupling elements 30 can be driven by way of the toothed belt 36 and put into rotary motion.

The respective second coupling elements 32 have mushroom-shaped projections that are formed on bearing journals 45 for the centric positioning of the second coupling elements 32 in centrical openings of the first coupling elements 30. The respective other ends of the bearing journals 45 include third driven parts 36 which, finally, transmit the torque provided by the drive motor 10 to the parts of the seat 50 to be adjusted.

The rotary motion of the drive motor 10 is transmitted to the third driven parts 36 of the second coupling elements 32 by way of the second driven parts 34 of the first coupling elements 30 when the second coupling elements 32 are in a frictionally engaged connection with the first coupling elements 30.

This connection is made by the cams 28.1 through 28.3 of the control shaft 22, whereby, depending on the position of the cams 28.1 through 28.3, an interior surface 41 of one of the first coupling elements 30 is selectively pressed against the friction surfaces 40 of the mushroom-shaped projection 43 of the second coupling element 32 against the force of one elastic spring 38 each. The interior surface and the friction surface 40 are formed concentrically to the axis of the respective second coupling element 32. Each one forms the surface of truncated cones, whereby the maximum torque to be transmitted can be increased, and/or the required coupling force can be reduced.

In the design example shown in FIGS. 1 and 2, the cam 28.1 actuates the first coupling 18.1, whereby the torque created by the drive motor 10 is transmitted by way of the third driven part 36 of the second coupling element 32 in order to perform a tilt adjustment of a seatback 50 of a motor vehicle seat 52 in the direction of the arrow 1. With the first coupling 18.1, the torque is transmitted by way of a flexible shaft 42 that extends into a square socket 44 of the third driven part 36.

The further driven parts 36 of the couplings 18.2 and 18.3 are connected with further seat components and make it possible to adjust the fore/aft position of the motor vehicle seat 52 in the direction of the arrow 11, and to adjust the height of the motor vehicle seat 52 in the direction of the arrow III.

A gear 39 is also connected to the third driven part 36 of the second coupling 18.2, which, when the seat adjustment mechanism is configured accordingly, can be used in addition to the flexible shafts 42 to transmit the torques.

Figure 3:
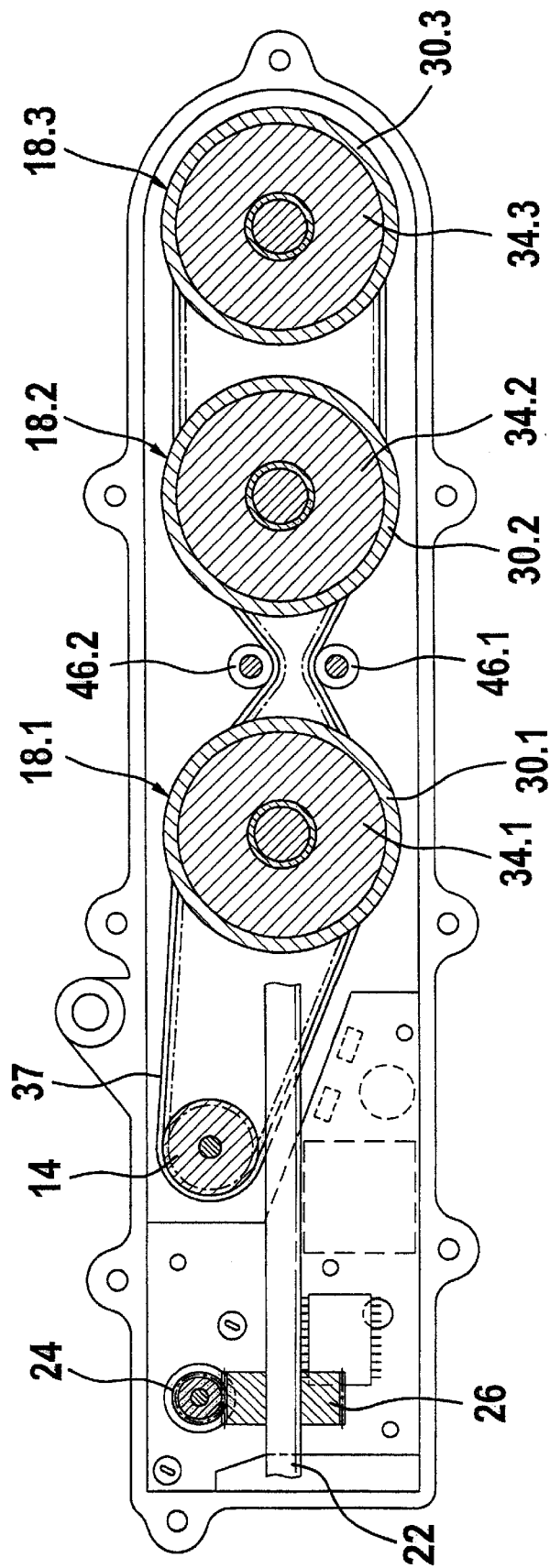
FIG. 3 shows a sectional drawing of the design example as well in a view in the direction of the arrow A in FIG. 1.

FIG. 3 shows the design example from FIG. 1 in the view in the direction of the arrow A shown in FIG. 1. The same features are labelled with the same reference numbers in this case as well.

FIG. 3 clearly shows the endless screw 24 of the electric coupling actuator 20, which is engaged with the worm wheel 26 of the coupling control shaft 22. Also shown is the first driven part 14 of the electric drive motor 10, as well as the couplings 18.1 through 18.3.

Also shown is the path of the toothed belt 36, which connects the second driven parts 34.1 through 34.3 of each of the first coupling elements 30.1 through 30.3, as well as the first driven part 14 with each other. Also shown are two tension pulleys 46.1 and 46.2 that are used, on the one hand, to tighten the toothed belt 36, and, on the other, to place the toothed belt 36 around a greater circumference of the driven parts 34.1 and 34.2.

The invention is not limited to the design example just described, of course. The deciding factor is that only one coupling actuator is provided to actuate multiple couplings.

What is claimed is:

1. Driver device for adjusting interior trim parts belonging to a motor vehicle having only one electric drive motor (10), which includes a first driven part (14), and having a driven unit (16) driven by said first driven part (14) having at least two couplings (18), characterized in that the driven unit (16) includes a coupling actuator (20) for the selective actuation of the at least two couplings (18.1, 18.1, 18.3), wherein the driven unit (16) includes a coupling control shaft (22) with fixedly attached cams (28) for selective actuation of at least two couplings (18.1, 18.2, 18.3).

2. Drive device according to claim 1, characterized in that the coupling shaft (22) cooperates with the coupling actuator (20) and the at least two couplings (18.1, 18.2; 18.3) for the selective actuation of the at least two couplings (18.1, 18.2, 18.3).

3. Driver device according to claim 1, characterized in that each of the at least two couplings (18.1,18.2, 18.3) includes a first coupling element (30) and a second coupling element (32).

4. Driver device according to claim 3, characterized in that second driven parts (34) are integrated in each of the first elements (30).

5. Driver device according to claim 4, characterized in that the first driven part (14) of the drive motor (10) is connected with the second driven parts (34) of each of the first coupling elements (30).

6. Driver device according to claim 5, characterized in that the connection is achieved by way of at least one toothed belt (37).

7. Driver device according to claim 3, characterized in that the second coupling elements (32) include third driven parts (36) for adjusting the interior trim parts.

8. Driver device according to claim 7, characterized in that the third driven parts (36) include square sockets to accommodate flexible shafts (42).

9. Driver device according to claim 1, characterized in that the at least two couplings (18) basically lie on a line.

10. Driver device according to claim 4, characterized in that each of the second driven parts (34) has a diameter, which is different from a diameter of said first driven part.

* * * * *